(No Model.)
H. L. MURCH.
WARPING CHOCK.
No. 316,997. Patented May 5, 1885.
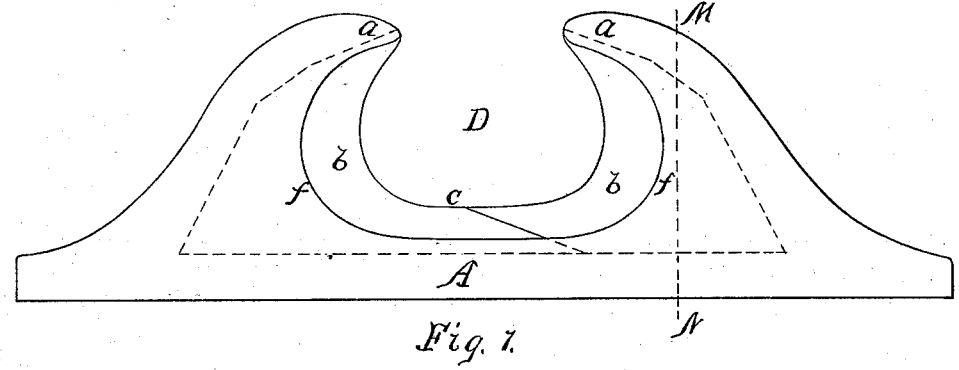
Fig. 1.
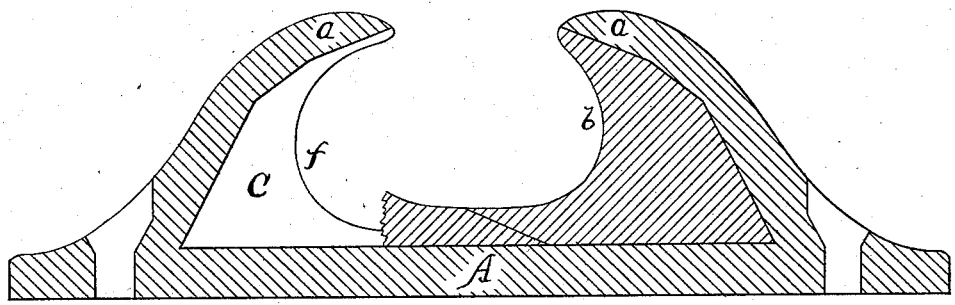
Fig. 2.
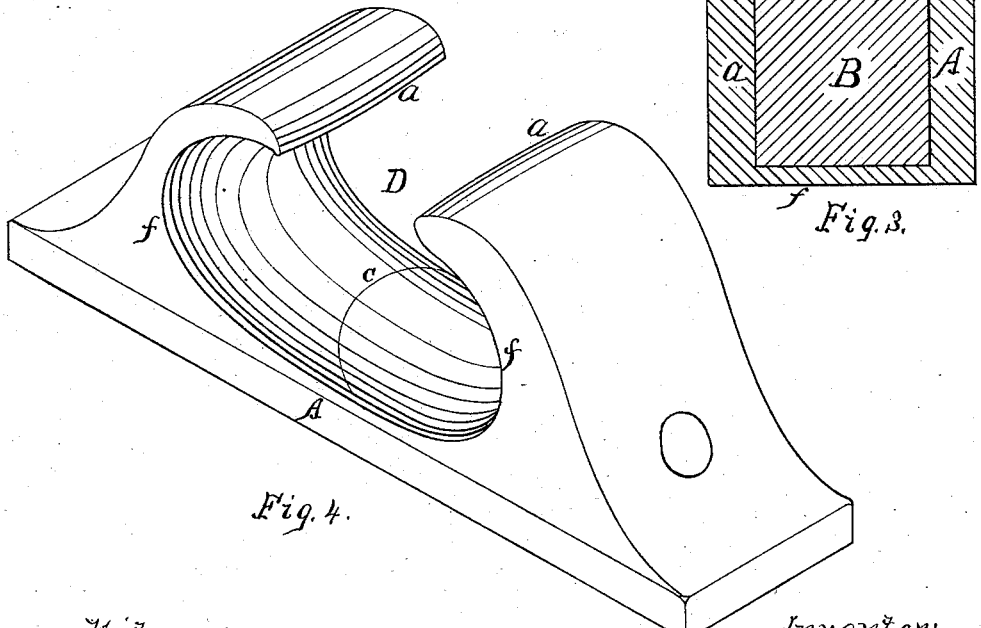
Fig. 3.
Fig. 4.
Witnesses:
H. H. Harlow
E. O. Goodridge
Inventor:
Henry L. Murch
By John R. Mason, Atty.

UNITED STATES PATENT OFFICE.

HENRY L. MURCH, OF ELLSWORTH, MAINE.

WARPING-CHOCK.

SPECIFICATION forming part of Letters Patent No. 316,997, dated May 5, 1885.

Application filed February 3, 1885. (No model.)

*To all whom it may concern:*

Be it known that I, HENRY L. MURCH, a citizen of the United States, residing at Ellsworth, in the county of Hancock and State of Maine, have invented a new and useful Warping-Chock; and I do hereby declare that the following is a full, clear, and exact description of the invention, which will enable others skilled in the art to which it appertains to make and use the same.

My invention relates to an improvement in warping-chocks for vessels, and is illustrated in the accompanying drawings, in which—

Figure 1 is a side elevation. Fig. 2 is a vertical longitudinal section, with a portion of the wooden lining of the chock broken out, and showing a part of the recess C in the iron frame. Fig. 3 is a vertical cross-section on the line $m\ n$. Fig. 4 is an isometric view.

Similar letters refer to corresponding parts throughout the several figures.

The object of my invention is to provide a warping-chock for vessels that shall perform all the functions of those now in use, and which at the same time shall lessen the wear upon the lines used by vessels in warping or towing from place to place.

The strain upon the warps or tow-lines of vessels is very great, and on this account the warping-chocks through which the lines pass, and against which they bear, are made massive and strong, and in all vessels well constructed, or of any size greater than a pleasure-boat, are formed entirely of metal, usually iron. Under the most favorable circumstances the wear of a line upon even a smooth or polished metal surface is very great; but, as a matter of fact, the bearing parts of the chock which cannot be kept painted or otherwise protected from the water and dampness of the sea are generally rusted and present a rough and gritty surface, which greatly wears and chafes the lines and rapidly destroys them. Indeed, it not infrequently happens that the strength and value of the line is seriously impaired by a single instance of use, and as these lines are necessarily of large size and correspondingly expensive, the necessity and utility of any device whereby the wear upon the lines is diminished becomes evident.

To remedy this defect in the warping-chocks in use, I have invented my chock, which is extremely simple in construction, but accomplishes the purpose before indicated and reduces the wear upon the lines to the utmost degree possible in the nature of the case.

In construction I use a metallic frame, A, having an external outline similar to that of the warping-chocks in common use, except that the eye for the reception of the line, formed by the inwardly-inclined horn-shaped projections $a\ a$, is made longer and deeper, and the external edges, $f\ f$, of both sides of that part of the frame A surrounding the eye are prolonged, and the prolongation extended all around the eye. The inner sides of the flanges $f\ f$ are made perpendicular to the bottom and sides of the recess formed by said flanges and the body of the frame A, to admit the insertion of the lining B in the manner hereinafter shown.

Into the recess or hollow C (shown in Fig. 2) formed by the frame A and the flanges or prolongations $f\ f$ upon its sides I fit a casing or lining of wood, B, as shown in Fig. 3, and at $b\ b$ in the other figures, having its bottom and sides so shaped as to conform to the shape of the recess C and fit within it as perfectly as may be, but formed with a lateral eye or recess, D, for the reception of the line, and extending upward and inward beyond the prolongations or flanges $f\ f$ of the metallic frame A. This casing is made of any strong and fine-grained wood. All its corners are rounded off, and its surface is made as smooth as possible.

As the shape of the recess C in the chock shown into which the wooden lining B fits would render it impossible to insert the lining in one piece, I cut the lining B in two parts, $b\ b$, on a miter, as shown at $c$, or form it in two parts, $b\ b$, having the ends cut on the same bevel, and by this means introduce the parts $b\ b$ into the recess C one after the other. The bearing of the lines is thus brought upon a smooth wooden surface, while the strain is supported by the metallic frame A, which at the same time holds the wooden lining or bearing parts $b\ b$ firmly in place. The inward overlapping curvature of the horns $a\ a$ of the frame A prevents any rising or lifting of the wooden bearing B and the flanges $ff$ upon the frame A, and horns $a\,a$ prevent its lateral motion. As a further precaution, I generally cement together the wooden bearing B and the inner walls of the recess C, as also the line of junction of the parts $b\,b$ of the bearing B, with some water-proof cement.

I do not claim, broadly, a recessed frame for a warping-chock or a lining therefor; but What I do claim as my invention, and desire to secure by Letters Patent, is—

1. In a warping-chock for vessels, the frame A, formed with the perpendicular flanges $ff$ upon the edges of the eye of said frame.

2. In a warping-chock for vessels, the combination of the wooden lining B, formed in two parts, $b\,b$, and the recessed frame A, formed with the flanges $ff$, all as shown and described, and substantially as and for the purpose specified.

HENRY L. MURCH.

Witnesses:
JOHN B. REDMAN,
LEWIS FREEMAN.